(12) United States Patent
Otagaki et al.

(10) Patent No.: US 10,836,354 B2
(45) Date of Patent: Nov. 17, 2020

(54) METHODS AND APPARATUS FOR A CAPACITIVE SENSOR

(71) Applicant: SEMICONDUCTOR COMPONENTS INDUSTRIES, LLC, Phoenix, AZ (US)

(72) Inventors: Takayasu Otagaki, Ota (JP); Kensuke Goto, Ashikaga (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/413,967

(22) Filed: May 16, 2019

(65) Prior Publication Data
US 2020/0238954 A1 Jul. 30, 2020

Related U.S. Application Data

(63) Continuation-in-part of application No. 16/255,945, filed on Jan. 24, 2019.

(60) Provisional application No. 62/825,465, filed on Mar. 28, 2019.

(51) Int. Cl.
*B60S 1/08* (2006.01)
*B32B 17/10* (2006.01)
*B60J 1/00* (2006.01)
*B32B 7/12* (2006.01)
*B60J 1/02* (2006.01)

(52) U.S. Cl.
CPC ............. *B60S 1/0825* (2013.01); *B32B 7/12* (2013.01); *B32B 17/10036* (2013.01); *B32B 17/10165* (2013.01); *B60J 1/001* (2013.01); *B60J 1/02* (2013.01); *B32B 2605/006* (2013.01)

(58) Field of Classification Search
CPC ............. B60S 1/0825; B32B 17/10036; B32B 17/10165; B32B 7/12; B32B 2605/006; B60J 1/001; B60J 1/02
USPC .......................................................... 324/665
See application file for complete search history.

(56) References Cited

U.S. PATENT DOCUMENTS

| | | | | |
|---|---|---|---|---|
| 5,682,788 A | * | 11/1997 | Netzer | ............... B32B 17/10036 318/444 |
| 6,028,990 A | * | 2/2000 | Shahani | ............... H01L 27/0805 257/301 |
| 6,094,987 A | | 8/2000 | Hochstein | |
| 6,144,017 A | * | 11/2000 | Millett | .................... F25D 21/02 219/203 |

(Continued)

FOREIGN PATENT DOCUMENTS

| | | |
|---|---|---|
| EP | 0960346 A1 | 12/1999 |
| EP | 1686026 A1 | 8/2006 |

(Continued)

*Primary Examiner* — Christopher P McAndrew
(74) *Attorney, Agent, or Firm* — The Noblitt Group, PLLC; Hettie L. Haines

(57) ABSTRACT

Various embodiments of the present technology may provide methods and apparatus for a capacitive sensor configured to detect rain. The capacitive sensor may be integrated within an interior surface of a laminated glass structure comprising an adhesive interlayer disposed between two glass layers. The capacitive sensor electrodes may be arranged in a variety of configurations between the two glass layers. The capacitive sensor may be used with a printed circuit board that is configured to electrically couple to the capacitive sensor electrodes.

20 Claims, 14 Drawing Sheets

(56) References Cited

U.S. PATENT DOCUMENTS

| | | | | |
|---|---|---|---|---|
| 2003/0222661 | A1* | 12/2003 | Fasen | G01D 1/04 |
| | | | | 324/662 |
| 2008/0222827 | A1* | 9/2008 | Veerasamy | B60S 1/0825 |
| | | | | 15/250.12 |
| 2008/0265913 | A1* | 10/2008 | Netzer | B60S 1/0822 |
| | | | | 324/669 |
| 2009/0039901 | A1 | 2/2009 | Delatte | |
| 2013/0113544 | A1 | 5/2013 | Salter | |

FOREIGN PATENT DOCUMENTS

| | | | |
|---|---|---|---|
| EP | 2870037 | A1 | 5/2015 |
| JP | 20000075052 | A | 3/2000 |
| JP | 2010160115 | A | 7/2010 |

\* cited by examiner

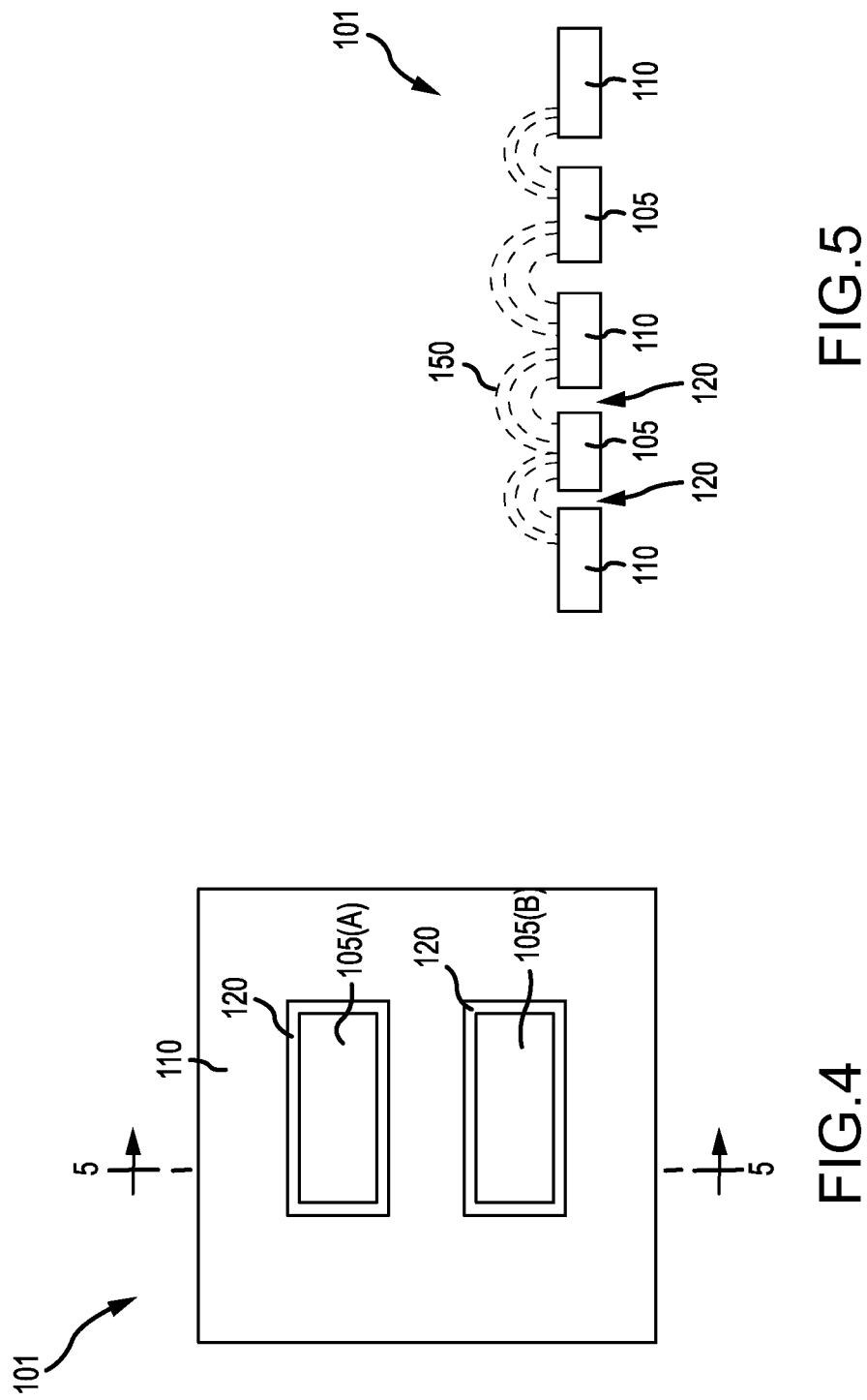

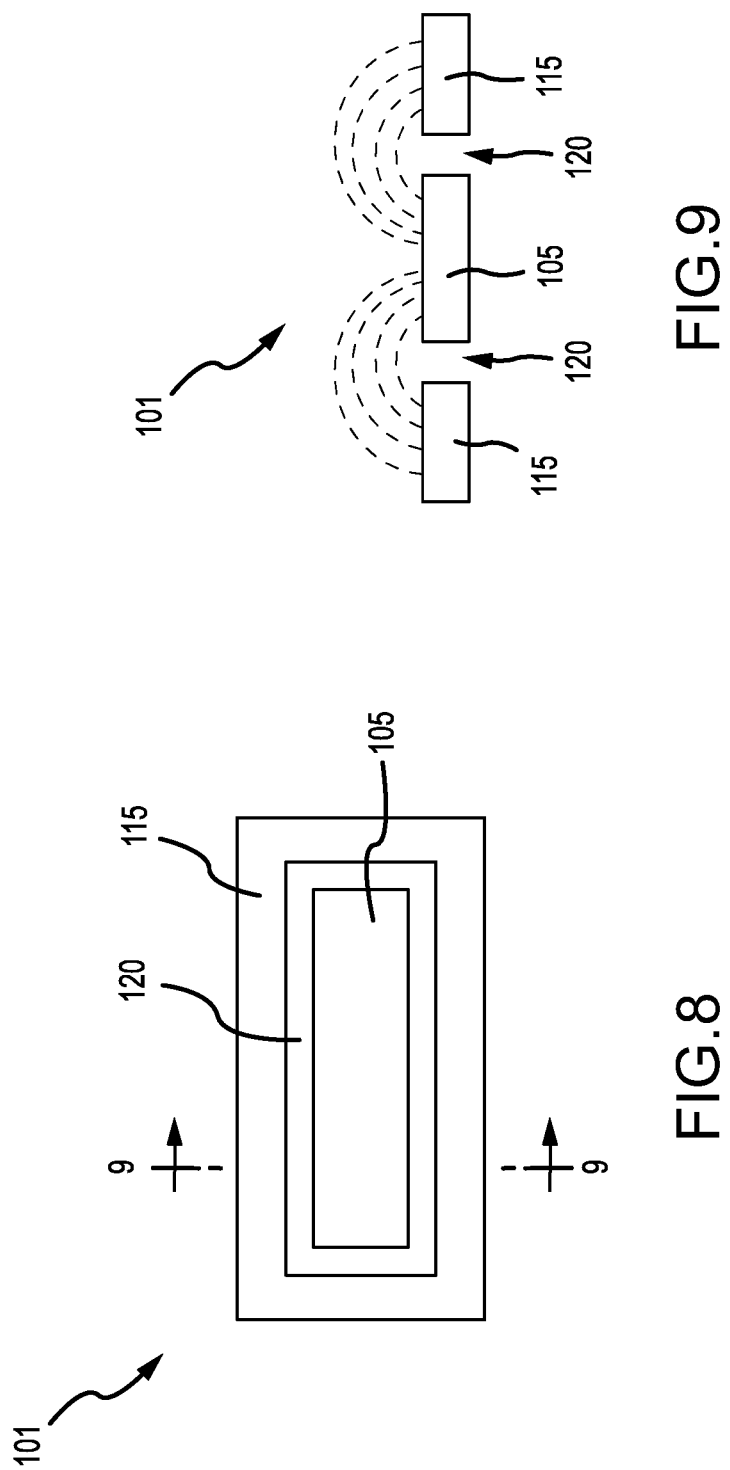

METHODS AND APPARATUS FOR A CAPACITIVE SENSOR

CROSS-REFERENCE TO RELATED APPLICATION

This application is a continuation-in-part of U.S. patent application Ser. No. 16/255,945, filed on Jan. 24, 2019. This application also claims the benefit of U.S. Provisional Patent Application Ser. No. 62/825,465, filed on Mar. 28, 2019, and incorporates the disclosure of the application in its entirety by reference.

BACKGROUND OF THE TECHNOLOGY

Capacitive sensors operate by detecting changes in the capacitance formed between a transmission electrode and a sense electrode. The degree of change in the capacitance may indicate various conditions, such as proximity, touch, pressure, and the like.

In some environments, it may be desired to detect a weather condition, such as rain on a windshield. In such a case, feedback from the capacitive sensor may indicate a raining condition, and in such a case, the feedback may be used to perform automated control of windshield wipers. Conventional sensors used to detect weather conditions, however, may experience varying levels of accuracy and sensitivity depending on the location of the sensor on the windshield.

SUMMARY OF THE INVENTION

Various embodiments of the present technology may provide methods and apparatus for a capacitive sensor configured to detect rain. The capacitive sensor may be integrated within an interior surface of a laminated glass structure comprising an adhesive interlayer disposed between two glass layers. The capacitive sensor electrodes may be arranged in a variety of configurations between the two glass layers. The capacitive sensor may be used with a printed circuit board that is configured to electrically couple to the capacitive sensor electrodes.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1A representatively illustrates a system featuring a capacitive sensor in accordance with various embodiments of the present technology;

FIG. 1B is a cross-sectional view of the capacitive sensor of FIG. 1 in accordance with various embodiments of the present technology;

FIG. 2 representatively illustrates a top view of a capacitive sensor in accordance with a first embodiment of the present technology;

FIG. 3 representatively illustrates a cross-sectional view of the capacitive sensor of FIG. 2 in accordance with the present technology;

FIG. 4 representatively illustrates a top view of a capacitive sensor in accordance with a second embodiment of the present technology;

FIG. 5 representatively illustrates a cross-sectional view of the capacitive sensor of FIG. 4 in accordance with the present technology;

FIG. 6 representatively illustrates a top view of a capacitive sensor in accordance with a third embodiment of the present technology;

FIG. 7 representatively illustrates a cross-sectional view of the capacitive sensor of FIG. 6 in accordance with the present technology;

FIG. 8 representatively illustrates a top view of a capacitive sensor in accordance with a fourth embodiment of the present technology;

FIG. 9 representatively illustrates a cross-sectional view of the capacitive sensor of FIG. 8 in accordance with the present technology;

FIG. 10 graphically illustrates a digital output of a sensor circuit in the absence of rain in accordance with various embodiments of the present technology;

FIG. 11 graphically illustrates a digital output of a sensor circuit in a light rain condition in accordance with various embodiments of the present technology;

FIG. 12 graphically illustrates a digital output of a sensor circuit in a heavy rain condition in accordance with various embodiments of the present technology;

Figure 15:
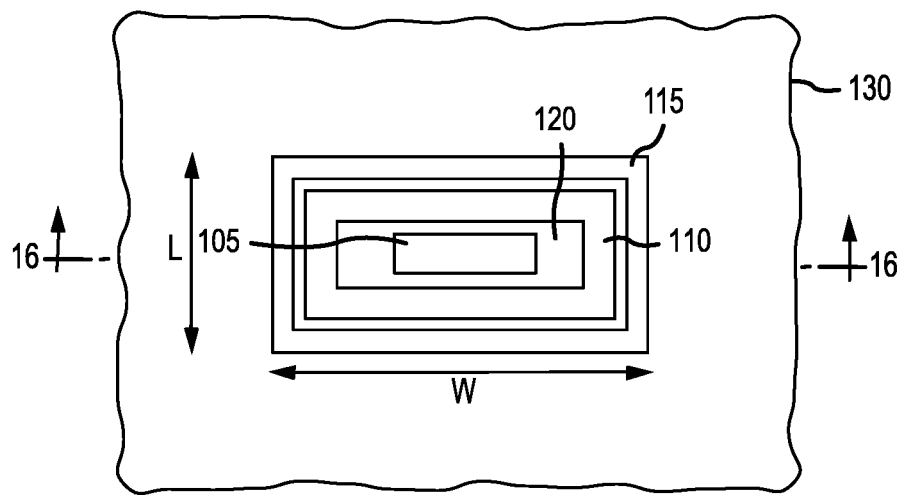
Figure 16:
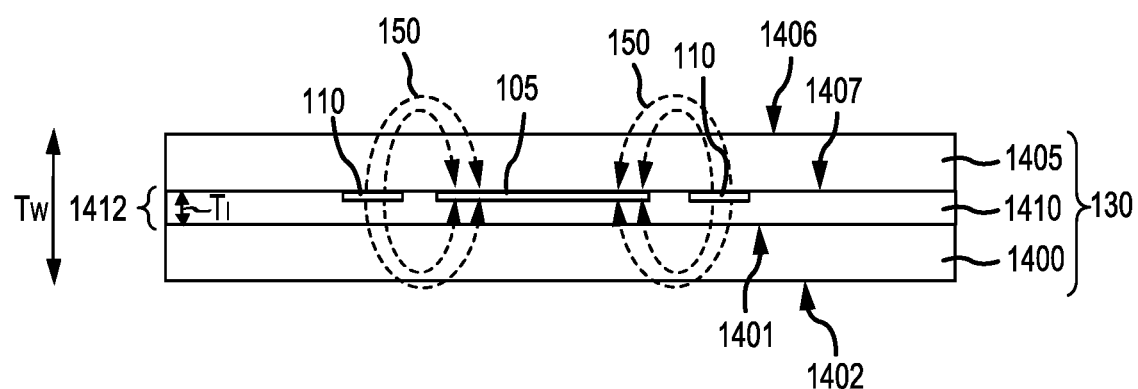
Figure 17:
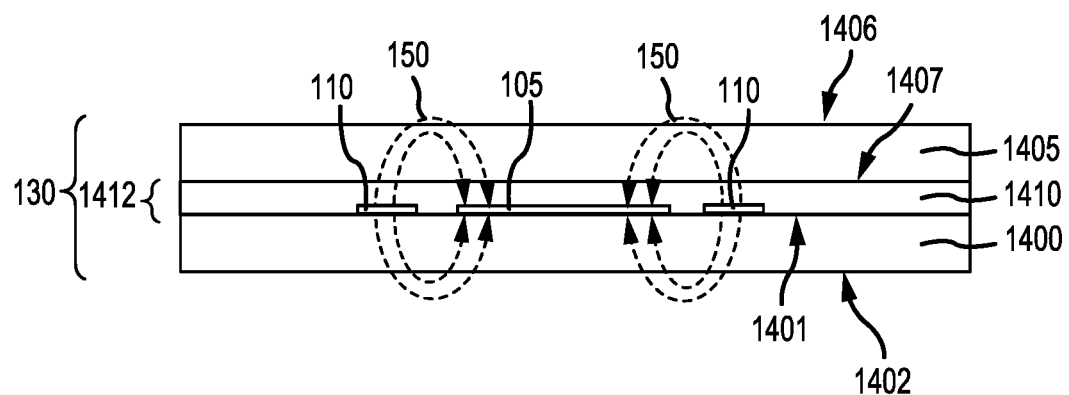
Figure 18:
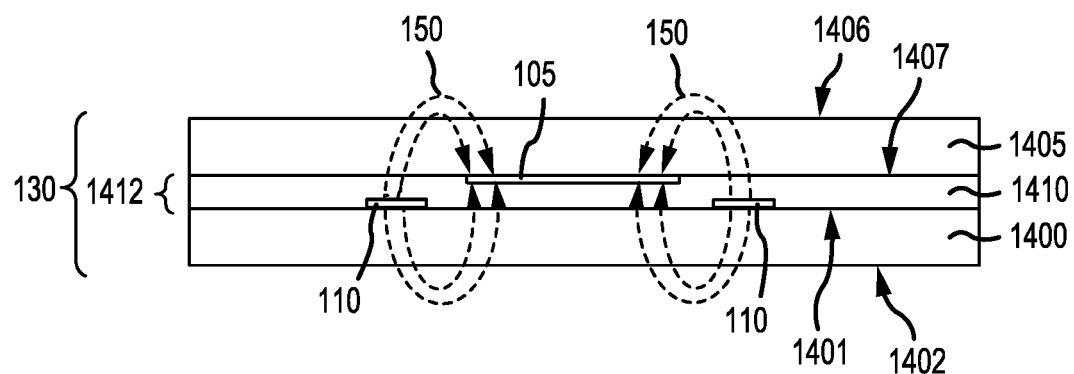
Figure 19:
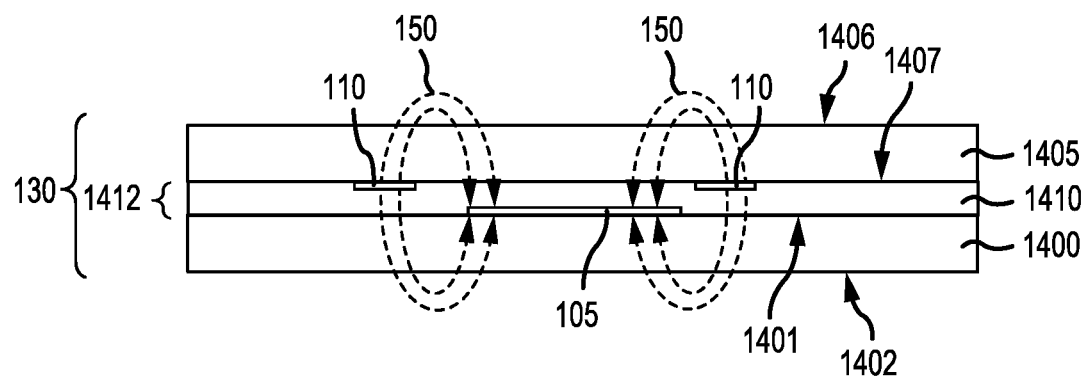
Figure 20:
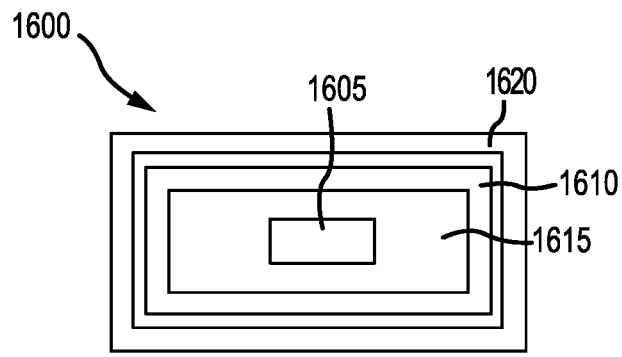
Figure 21:
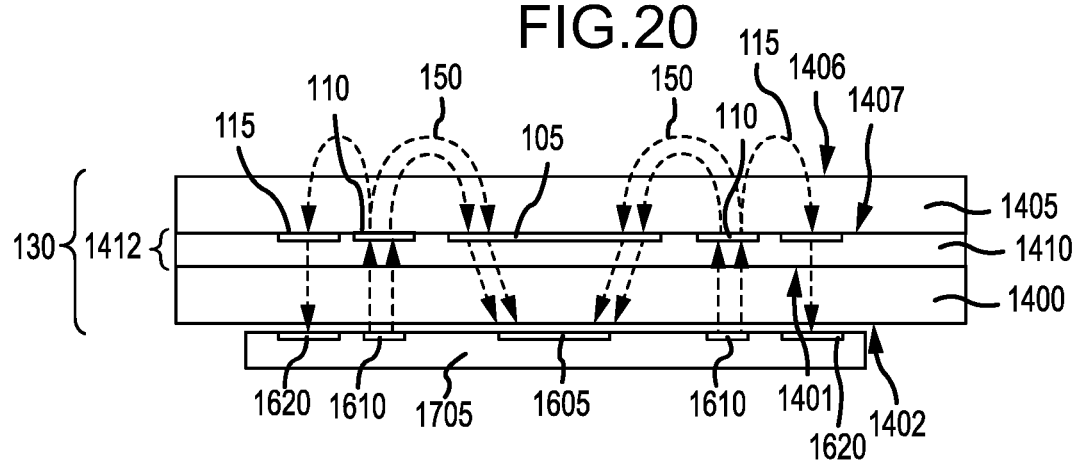
Figure 22:
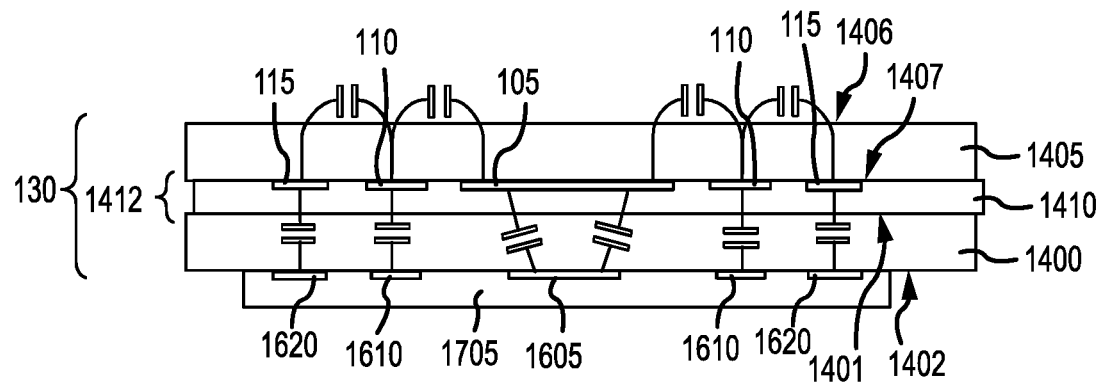
Figure 23:
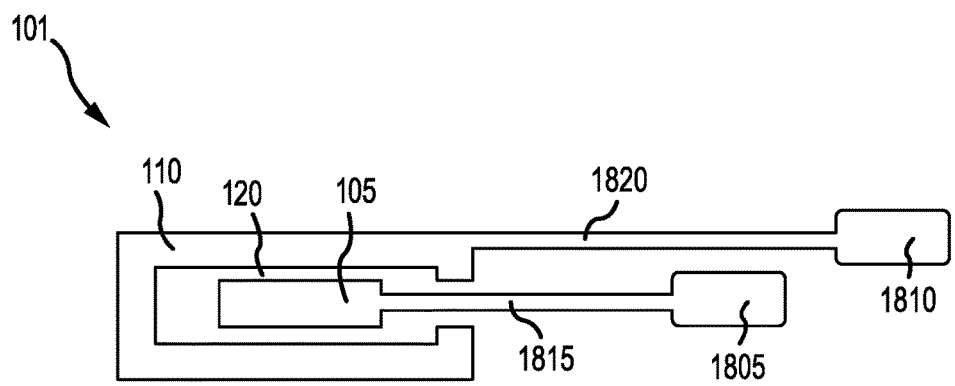
Figure 24:
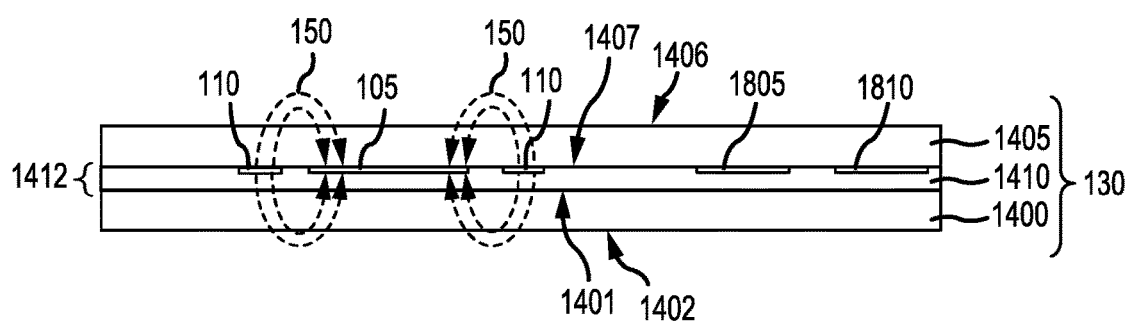
Figure 25:
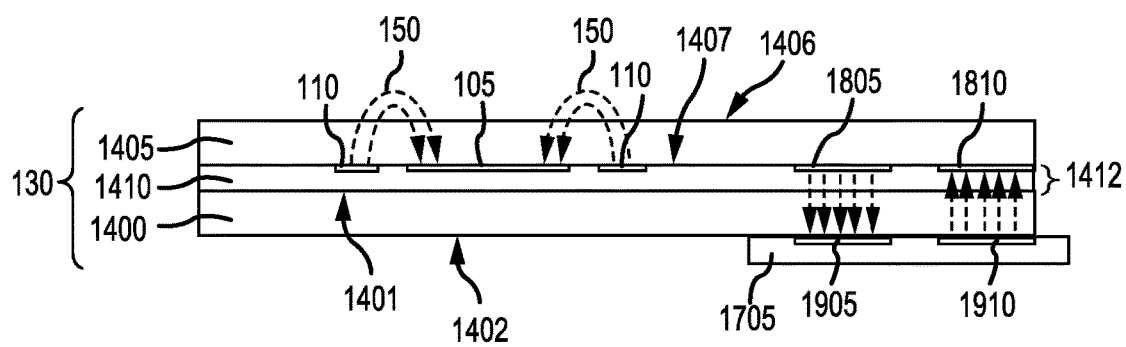
Figure 26:
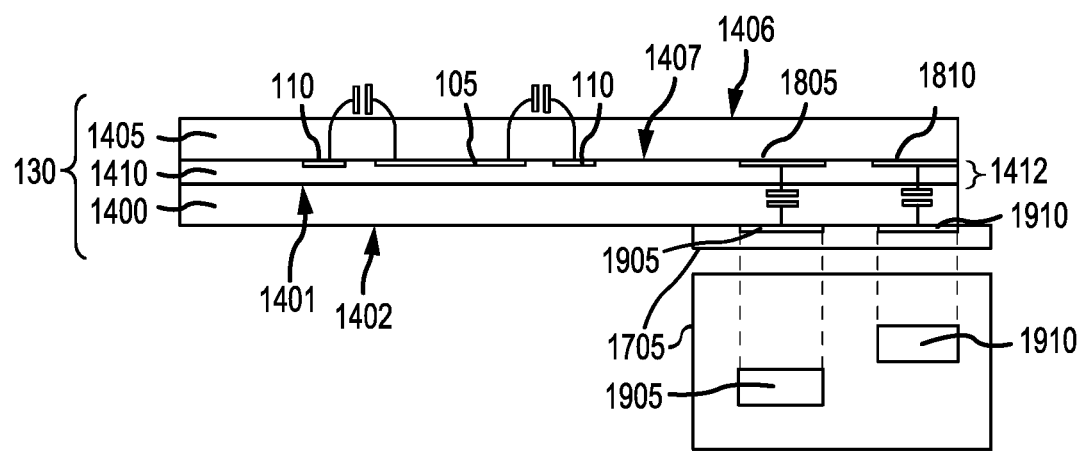

FIG. 15 representatively illustrates a top view of a capacitive sensor in accordance with various embodiments of the present technology;

FIG. 16 representatively illustrates a cross-sectional view of the laminated glass windshield with the capacitive sensor of FIG. 15 in a first arrangement in accordance with a fifth embodiment of the present technology;

FIG. 17 representatively illustrates a cross-sectional view of the laminated glass windshield with the capacitive sensor of FIG. 15 in a second arrangement in accordance with a sixth embodiment of the present technology;

FIG. 18 representatively illustrates a cross-sectional view of the laminated glass windshield with the capacitive sensor of FIG. 15 in a third arrangement in accordance with a seventh embodiment of the present technology;

FIG. 19 representatively illustrates a cross-sectional view of the laminated glass windshield with the capacitive sensor of FIG. 15 in a fourth in accordance with an eighth embodiment of the present technology;

FIG. 20 representatively illustrates a top view of a capacitive sensor in accordance with various embodiments of the present technology;

FIG. 21 representatively illustrates a cross-sectional view of the arrangement of the first capacitive sensor of FIG. 15 and the second capacitive sensor of FIG. 20 in a capacitive printed glass sensor in accordance with a ninth embodiment of the present technology;

FIG. 22 representatively illustrates an equivalent circuit of the arrangement of FIG. 21;

FIG. 23 representatively illustrates a first capacitive sensor with extended capacitive pads;

FIG. 24 representatively illustrates a cross-sectional view of an arrangement of the first capacitive sensor with extended capacitive pads of FIG. 23 in a capacitive printed glass in accordance with a tenth embodiment of the present technology;

FIG. 25 representatively illustrates a cross-sectional view of an arrangement of the first capacitive sensor with extended capacitive pads of FIG. 23 and a second capacitive sensor in a capacitive printed glass sensor in accordance with an eleventh embodiment of the present technology; and FIG. 26 representatively illustrates a cross-sectional view of an equivalent circuit of the sensor arrangement of FIG. 25.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, switching devices, current sources, voltage sources, logic gates, semiconductor devices, such as transistors, capacitors, and the like, which may carry out a variety of functions. In addition, the present technology may be integrated in any number of electronic systems, such as automotive, aviation, "smart devices," portables, "white goods," and consumer electronics, and the systems described are merely exemplary applications for the technology.

Figure 1A:
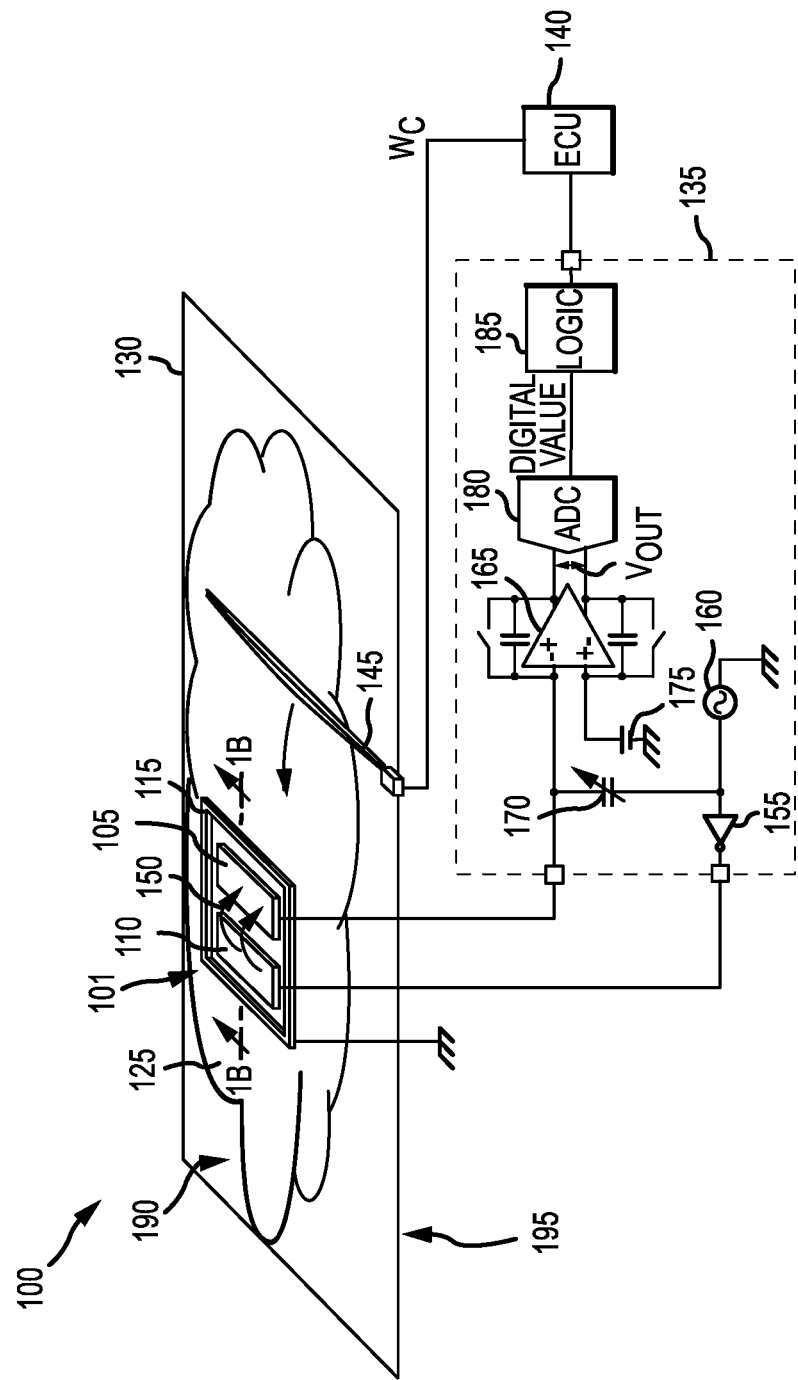
Figure 1B:
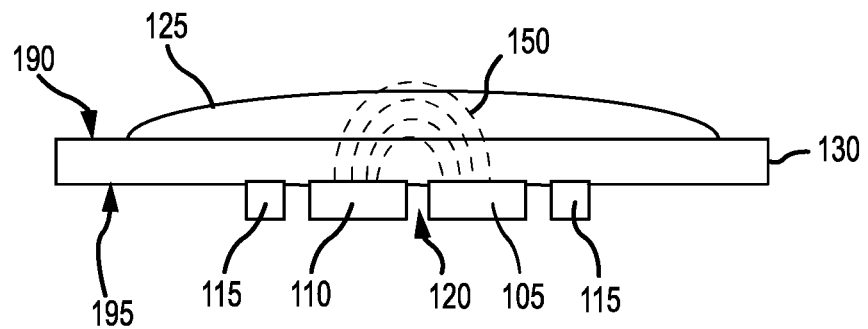

Referring to FIGS. 1A-1B, an exemplary system 100 may be integrated in a vehicle (not shown) and configured to detect the presence of a substance 125 in a particular weather condition, such as rain, ice, and snow, on a surface (such as a windshield 130) of the vehicle. For example, the system 100 may comprise a capacitive sensor 101, a sensing circuit 135, and an electronic control unit (ECU) 140. The system 100 may be further configured to utilize information from the capacitive sensor 101 to automatically control or otherwise operate a windshield wiper 145. The windshield wiper 145 may comprise any suitable wiper used to remove debris and/or a weather substance, such as rain, from the windshield 130.

The capacitive sensor 101 may be configured as a mutual capacitance sensor. For example, the capacitive sensor 101 may comprise a first electrode 105 in communication with a second electrode 110 and separated by a gap 120. The gap 120 may comprise a dielectric material, such as such as porcelain, glass, plastic, air, nitrogen, sulfur hexafluoride, parylene, mineral oil, castor oil, ionic crystal, polymer, ferromagnetic materials, piezoelectric materials, and the like. The dimensions of the capacitive sensor 101 may be selected according to the particular application. For example, a capacitive sensor 101 used to detect rain may have an overall dimension of approximately 23 mm in length (L), approximately 30 mm in width (W), and less than approximately 0.2 mm in height (thickness).

The first and second electrodes 105, 110 may be configured to form an electric field 150, such that one electrode operates as a drive electrode and the remaining electrode operates as a reception electrode. The first and second electrodes 105, 110 may be formed using a conductive material, such as metal, indium tin oxide, polyethylene terephthalate (PET) film, a flexible printed circuit (FPC), and the like. Either one of the first and second electrodes 105, 110 may be connected (either directly or indirectly) to a power source 160 that pulses between two voltage levels to generate a drive signal, while the remaining electrode is connected to a variable capacitor 170. For example, either one of the first and second electrodes 105, 110 may be connected directly to the power source 160 or connected to the power source via an inverter 155. Accordingly, the electrode that is connected to the power source 160 may be referred to as the drive electrode and the electrode that is connected to the variable capacitor 170 may be referred to as the reception electrode.

The capacitive sensor 101 may further comprise a third electrode 115 connected to a ground potential or other suitable reference potential. The ground potential may comprise an actual ground, rather than a "floating ground" or a "virtual ground." According to various embodiments, the third electrode 115 may be positioned adjacent to and planar with the first and second electrodes 105, 110.

According to various embodiments, the first, second, and third electrodes 105. 110, 115 may be formed on an upward-facing horizontal surface of a substrate (not shown), such as a flexible plastic substrate or a printed circuit board.

Referring to FIG. 1B, the capacitive sensor 101 may be affixed to an interior side 195 of the windshield 130—in other words, the side facing into a cabin of the vehicle. According to various embodiments, the capacitive sensor 101 may generate an electric field 150 that extends between the first and second electrodes, through the windshield 130, and above an outer surface 190 of the windshield 130.

In another application, the capacitive sensor 101 may be affixed to the outer surface 190 of the windshield 130, wherein the capacitive sensor 101 makes direct contact with the rain, ice, or snow.

Figure 14:
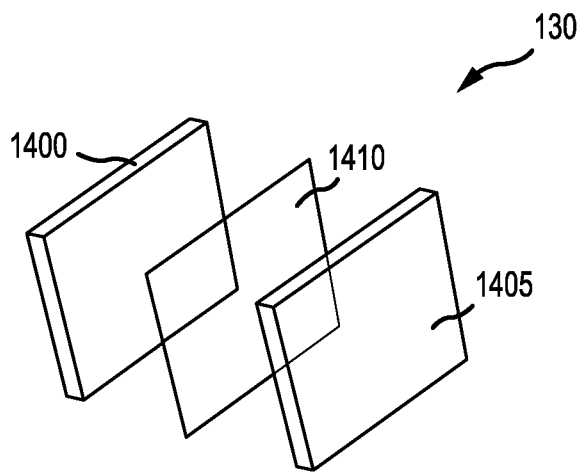
FIG. 14 is an exploded view of a laminated glass windshield in accordance various embodiments of the present technology.

In yet another application, the capacitive sensor 101 may be integrated into a laminated glass structure. For example, and referring to FIGS. 14 and 16, the windshield 130 may comprise a laminated glass structure formed from multiple glass layers bonded together with an adhesive material. According to the present embodiment, the laminated glass windshield 130 may comprise a first glass layer 1400 and a second glass layer 1405, and the first and second glass layers 1400, 1405 may be separated by an interlayer 1410. According to an exemplary embodiment, the capacitive sensor 101 may be disposed within the interlayer 1410.

The first glass layer 1400 may comprise a first surface 1402 (i.e., an outer surface) and a second surface 1401 (i.e., an inner surface) 1401. The second surface 1401 may be in direct contact with the interlayer 1410. Similarly, the second glass layer 1405 may comprise a third surface 1406 (i.e., outer surface) and a fourth surface 1407 (i.e., an inner surface). The fourth surface 1407 may be in direct contact with the interlayer 1410. In addition, the third surface 1406 of the second glass layer 1405 may be outside the vehicle, while first surface 1402 of the first glass layer 1400 may be on the inside of the vehicle.

The interlayer 1410 may comprise an adhesive material, such as polyvinyl butyral, anaerobic adhesives, cyanoacrylate adhesives, polymer adhesives, thermally cured epoxies, radiation cured epoxies, polyurethane adhesives and structural acrylic. The laminated glass windshield 130 may be formed by any known assembly or manufacturing methods such as layering, printing, chemical deposition and magnetic deposition.

According to an exemplary embodiment, the laminated glass structure may have an overall thickness $T_W$ in the range of 3.5 mm to 6 mm, and the interlayer 1410 may have a thickness $T_I$ that is approximately 0.2 mm. The thickness of each glass layer and interlayer may be selected according to the particular application.

Figure 3:
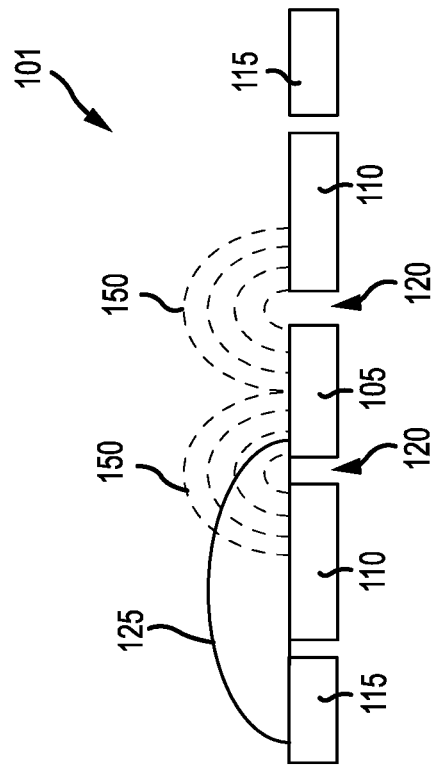
Figure 2:
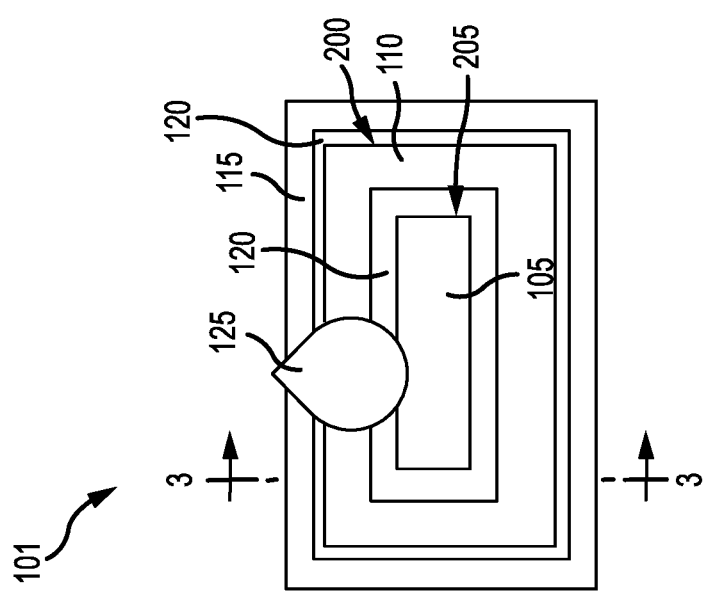

In a first embodiment, and referring to FIGS. 2 and 3, the first, second, and third electrodes 105, 110, 115 of the capacitive sensor 101 may be arranged as concentric with each other, and may be in the shape of squares, circles, or any other suitable shape. According to the present embodiment, the first, second, and third electrodes 105, 110, 115 are also planar with each other. In addition, due to the concentric pattern, the second electrode 110 is directly adjacent to and surrounds an outer perimeter 205 of the first electrode 105, and the third electrode 115 is directly adjacent to and surrounds an outer perimeter 200 (i.e. outer edge) of the second electrode 110. In other words, the second electrode 110 is nested within an interior space defined by the third electrode 115, and the first electrode 105 is nested within an interior space defined by the second electrode 110. The first, second, and third electrodes 105, 110, 115 may be situated on a single continuous surface, such as the horizontal surface of the substrate or the windshield 130.

According to the present embodiment, the first electrode 105 may operate as the reception electrode, the second electrode 110 may operate as the drive electrode, and the third electrode 115 may be connected to the ground potential.

In a second embodiment, and referring to FIGS. 4 and 5, the capacitive sensor 101 may comprise a plurality of first electrodes, such as first electrodes 105(A), 105(B), surrounded by and directly adjacent to the second electrode 110. In other words, the first electrodes 105(A), 105(B) are nested within a space defined by the second electrode 110. According to the present embodiment, the first electrodes 105(A), 105(B) may operate as both the reception electrode and the ground. For example, one of the first electrodes (e.g., first electrode 105(A)) may operate as the reception electrode, the second electrode 110 may operate as the drive electrode, and a different first electrode (e.g., first electrode 105(B)) may operate as the ground. The operation of the plurality of first electrodes 105(A), 105(B) may switch periodically, such that at a first time, one of the first electrodes (e.g., first electrode 105(A)) operates as the reception electrode while the remaining first electrode (e.g., first electrode 105(B)) operates as the ground. At a second time, a different first electrode (e.g., first electrode 105(B)) operates as the reception electrode while the remaining first electrode (e.g., first electrode 105(A)) operates as the ground.

In addition, the first and second electrodes 105(A), 105(B), 110 may be planar with each other, with the second electrode 110 surrounding an outer edge of each first electrode 105. For example, the first and second electrodes 105(A) 105(B), 110 may be situated on a single continuous surface, such as the horizontal surface of the substrate or a surface of the windshield 130.

Figure 6:
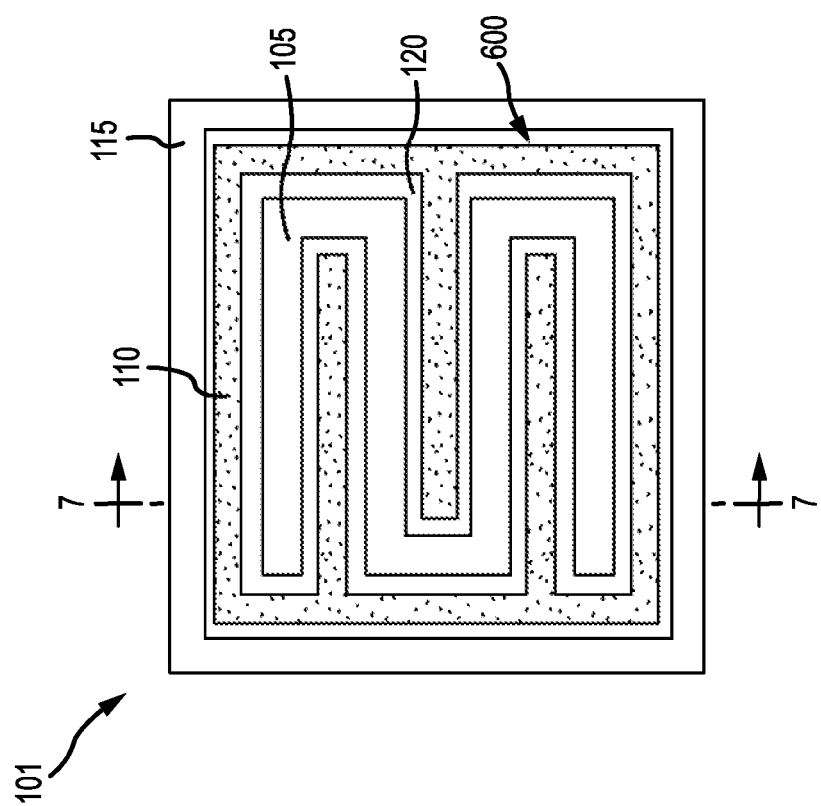
Figure 7:
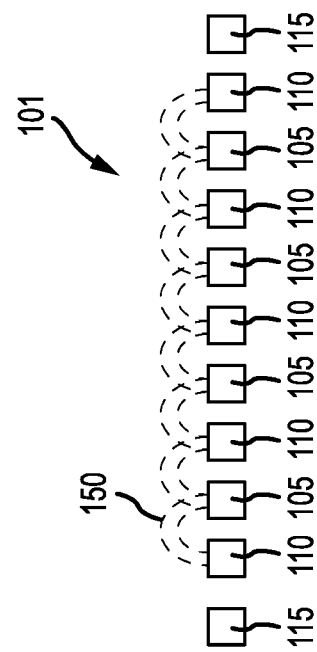

In a third embodiment, and referring to FIGS. 6 and 7, the first electrode 105 may comprise a continuous set of linear segments that may form a U-shape, an S-shape, multiple U-shapes connected together, and the like. The second electrode 110 forms a comb shape that surrounds and interleaves the first electrode 105. According to the present embodiment, the third electrode 115 is directly adjacent to and surrounds an outer perimeter 600 (i.e., outer edge) of the second electrode 110.

According to the present embodiment, the first electrode 105 may operate as the reception electrode, the second electrode 110 may operate as the drive electrode, and the third electrode 115 is connected to the ground potential. In addition, the first, second, and third electrodes 105, 110, 115 may be planar with each other. For example, the first, second, and third electrodes 105, 110, 115 may be formed directly on the horizontal surface of the substrate. In other words, the second electrode 110 is nested within an interior space defined by the third electrode 115, the first electrode 105 is nested within an interior space defined by the second electrode 110, and the first, second, and third electrodes 105, 110, 115 are situated on a single continuous surface, such as the horizontal surface of the substrate or a surface of the windshield 130.

In a fourth embodiment, and referring to FIGS. 8 and 9, the capacitive sensor 101 may be configured as a self-sensing type capacitor, as opposed to a mutual-capacitance type sensing capacitor. According to the present embodiment, the capacitive sensor 101 comprises the first electrode 105 that operates as the reception electrode and the third electrode 115 that is connected to the ground potential. According to the present embodiment, the third electrode 115 is planar with and surrounds an outer edge of the first electrode 105. In other words, the first electrode 105 is nested within an interior space defined by the third electrode 115, and the first and third electrodes 105, 115 are situated on a single continuous surface, such as the horizontal surface of the substrate or a surface of the windshield 130.

According to various embodiments, and referring to FIGS. 14-26, in an application utilizing the laminated glass windshield 130, the capacitive sensor 101 may be integrated into (embedded within) the interlayer 1410 of the windshield 130. In various embodiments, the electrodes of the capacitive sensor 101 may be situated on a single plane, or alternatively, may be arranged on different planes.

For example, and referring to FIGS. 15 and 16, the capacitive sensor 101 may be embedded within the laminated glass windshield 130. In the present embodiment, the first and second electrodes 105, 110 may be planar with each other and both electrodes may be in contact with the fourth surface 1407 of the second glass layer 1405.

Alternatively, and referring to FIGS. 15 and 17, where the capacitive sensor 101 is embedded within the interlayer 1410, the first and second electrodes 105, 110 may be planar with each other and both electrodes may be in contact with the second surface 1401 of the first glass layer 1400.

Referring to FIGS. 18 and 19, in yet other arrangements where the capacitive sensor 101 is embedded within the interlayer 1410, the first electrode 105 may be in contact with the fourth surface 1407 of the second glass layer 1405 and the second electrode 110 may be in contact with the first surface 1401 of the first glass layer 1400. Alternatively, the first electrode 105 may be in contact with the first surface 1401 of the first glass layer 1400 and the second electrode 110 may be in contact with the fourth surface 1407 of the second glass layer 1405.

According to various embodiments, and referring to FIGS. 23-24, the capacitive sensor 101 may further comprise a first electrode pad wire 1815 that connects the first electrode 105 to a first electrode pad 1805. The first electrode pad wire 1815 and the first electrode pad 1805 may have the same voltage as the first electrode 105. Similarly, the first capacitive sensor 101 may further comprise a second electrode pad wire 1820 that connects the second electrode 110 to a second electrode pad 1810. The second electrode pad wire 1820 and the second electrode pad 1810 may have the same voltage as the second electrode 110. The first electrode pad wire 1815, the first electrode pad 1805, the second electrode pad wire 1820, and the second electrode pad 1810 may be formed using a conductive material, such as metal, indium tin oxide, polyethylene terephthalate (PET) film, a flexible printed circuit (FPC), and the like.

According to various embodiments, the first electrode 105 and the corresponding first electrode pad wire 1815 and first electrode pad 1805 may be situated in a same plane or a different plane from each other. In addition, the second electrode 110 and the corresponding second electrode pad wire 1820 and the second electrode pad 1810 may be situated in a same plane or a different plan from each other. In addition, the first electrode pad wire 1815 and corresponding first electrode 1805 may be situated in a same plane or a different plane from each other.

According to various embodiments, and referring to FIGS. 20-26, the capacitive sensor 101 may be configured to electrically couple to a companion sensor 1600 formed on a printed circuit board (PCB) 1705. The capacitive sensor 101 may be embedded within the laminated windshield 130, while the companion sensor 1600 and PCB 1705 may be situated on an outer surface of the windshield 130 (e.g., the first or third surfaces). In various embodiments, when a fluid contacts at least one of the first glass layer outer surface 1402 and the second glass layer outer surface 1406, a change in capacitance between the first electrode 105 and the second electrode 110 may be detected by the companion sensor 1600. In various embodiments, a size and a shape of the companion sensor 1600 may be selected to mirror or otherwise match the size and shape of the electrode in which it forms a capacitance with.

In various embodiments, the PCB 1705 may further comprise a companion ground electrode to electrically connect to the ground electrode 115.

In various embodiments, the companion sensor 1600 may comprise a fourth electrode 1605, a fifth electrode 1610, and a second dielectric separation 1615 separating the fourth and fifth electrodes 1605, 1610. The second dielectric separation 1615 may comprise any number of dielectric materials, such as porcelain, glass, plastic, air, nitrogen, sulfur hexafluoride, parylene, mineral oil, castor oil, ionic crystal, polymer, ferromagnetic materials, piezoelectric materials, and the like. The fourth electrode 1605 and the fifth electrode 1610 may be formed using a conductive material, such as metal, indium tin oxide, polyethylene terephthalate (PET) film, a flexible printed circuit (FPC), and the like.

In various embodiments, the first electrode 105 and the second electrode 110 may be configured in any arrangement, such as those described above. For example, the first and second electrodes 105, 110 may be in contact with different glass layer surfaces or a same glass layer surface. In addition, the fourth electrode 1605 and the fifth electrode 1610 may be placed in contact with at least one of the first surface 1402 of the first glass layer 1400 and the third surface 1406 of the second glass layer 1405.

In an exemplary embodiment, and referring to FIGS. 20-22, the first electrode 105 may directly form a capacitance with the fourth electrode 1605 and the second electrode 110 may directly form a capacitance with the fifth electrode 1610. In the present embodiment, the size and the shape of the fourth electrode 1605 is a similar size and shape to the first electrode 105 and the size and shape of the fifth electrode 1610 is a similar size and shape to the second electrode 110. In addition, the distance between the fourth electrode 1605 and the fifth electrode 1610 is similar to the distance between the first electrode 105 and the second electrode 110.

According to the present embodiment, the fourth electrode 1605 may be substantially aligned with and substantially parallel to the first electrode 1505. Similarly, the fifth electrode 1610 is substantially aligned with and substantially parallel to the second electrode 110.

In an alternative embodiment, and referring to FIGS. 23-25, the companion sensor 1600 may be configured to electrically connect to the first and second electrode pads 1805, 1810. Accordingly, the first electrode pad 1805 may form a capacitance with the fourth electrode 1605 and the second electrode pad 1810 may form a capacitance with the fifth electrode 1610. In the present embodiment, the size and the shape of the companion electrode 1600 mirrors the size and shape of the electrode pads 1805, 1810. For example, the fourth electrode 1605 is a similar size and shape to the first electrode pad 1805 and the size and shape of the fifth electrode 1610 is a similar size and shape to the second electrode pad 1810. The distance between the fourth electrode 1605 and the fifth electrode 1610 is similar to the distance between the first electrode pad 1805 and the second electrode pad 1810. In addition, the fourth electrode 1605 is substantially aligned with and substantially parallel to the first electrode pad 1805, and the fifth electrode 1610 is substantially aligned with and substantially parallel to the second electrode pad 1810.

The first electrode 105 may form a capacitance with the fourth electrode 1605 and the second electrode 105 may form a capacitance with the fifth electrode 1610. These capacitances may permit the companion sensor 1600 to detect the change in capacitance in the capacitive sensor 101.

Various embodiments, such as those where the capacitive sensor 101 is integrated in the laminated glass structure, may exhibit increased sensitivity and improved sensing capabilities than embodiments where the capacitive sensor 101 is located on the interior surface of a single-glass layer windshield 130. This may be due, in part, to the electric field 150 produced by the capacitive sensor. In the embodiment where the capacitive sensor 101 is integrated within the laminated windshield, the sensing field (electric field 150) on the outside of the glass may be stronger than the electric field 150 of a capacitive sensor 101 placed on the interior surface of the single-glass layer windshield 130, since the glass layers (e.g., 1405, 1400) of the laminated windshield 130 may be thinner than a total thickness of a non-laminated glass windshield (i.e., single layer glass windshield).

The sensing circuit 135 may be responsive to the electric field 150 and configured to measure a capacitance and/or a change in capacitance of the capacitive sensor 101. For example, in a raining condition, the third electrode 115 connects the rain to the ground potential resulting in a decrease in the capacitance of the capacitive sensor 101. The sensing circuit 135 may be configured to detect the decrease and/or an increase in capacitance of the capacitive sensor 101.

According to an exemplary embodiment, the sensing circuit 135 may comprise a differential amplifier 165 to measure and/or detect changes in the capacitance. For example, the differential amplifier 165 may comprise an inverting terminal (−) connected to the electrode operating as the reception electrode (e.g., the first electrode 105) and a non-inverting terminal (+) connected to a reference voltage, such as supplied by a voltage source 175. The differential amplifier 165 may be configured to measure or detect a voltage difference between the inverting and non-inverting terminals and generate an output voltage $V_{OUT}$ according to the voltage difference. The differential amplifier 165 may also apply a gain to the voltage difference.

The sensing circuit 135 may further comprise various circuits and/or systems to process, convert, and/or analyze the output voltage $V_{OUT}$. For example, the sensing circuit 135 may comprise an analog-to-digital converter (ADC) 180 and a logic circuit 185.

According to an exemplary embodiment, the sensing circuit 135 may further comprise the variable capacitor 170 and the power source 160. The sensing circuit 135 may further comprise the inverter 155, which is connected between the power source 160 and the capacitive sensor 101.

The ADC 180 may be connected to an output terminal of the differential amplifier 165 and configured to convert the output voltage $V_{OUT}$ to a digital value (i.e., AD value). According to various embodiments, as the capacitance of the capacitive sensor 101 decreases, the corresponding digital value increases and vise versa. The ADC 180 may transmit the digital value to the logic circuit 185. The ADC 180 may comprise any signal converter suitable for converting an analog signal to a digital signal.

Figure 10:
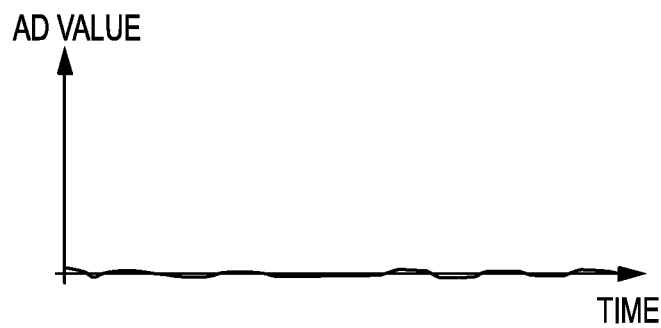
Figure 11:
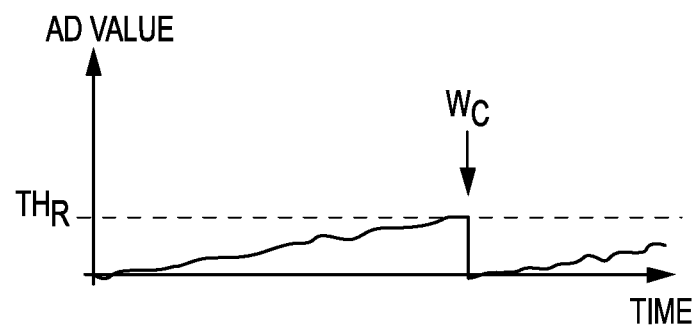
Figure 12:
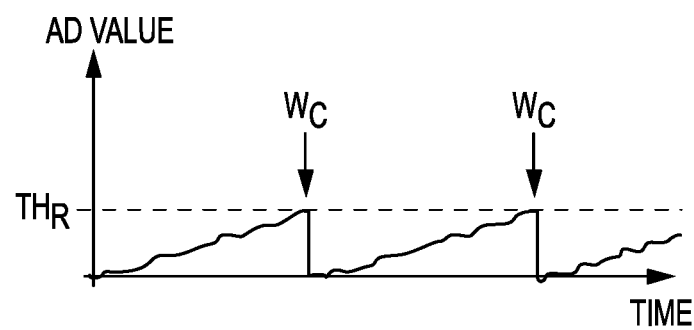

The logic circuit 185 may receive the digital value from the ADC 180, interpret the values, and perform an appropriate response and/or produce an appropriate output signal according to the digital value. According to various embodiments, the logic circuit 185 may be programmed with a predetermined threshold $TH_R$ (for example, as illustrated in FIGS. 10-12) that corresponds to a particular digital value. The logic circuit 185 may utilize the predetermined threshold $TH_R$ to detect the presence of rain. For example, the logic circuit 185 may compare the digital value from the ADC 180 with the predetermined threshold $TH_R$ and generate a logic signal corresponding to the comparison. The logic signal may have a first value (e.g., a digital value) if the digital value is less than the predetermined threshold $TH_R$ and may have a second value if the digital value is greater than or equal to the predetermined threshold $TH_R$. The first value may indicate an absence of rain and the second value may indicate a presence of rain. The logic circuit 185 may comprise any number of circuits, logic gates, and the like, that operate together to analyze the digital value and generate a signal according to the analysis.

The electronic control unit (ECU) 140 may be configured to receive an output signal from sensing circuit 135, such as the logic signal. The ECU 140 may utilize the logic signal to operate or otherwise control the windshield wiper 145 according to a control signal, such as a wiper signal Wc, to remove the rain (or other substance 125) from the windshield. For example, the ECU 140 may start or stop a wiping action (left to right motion) by the windshield wiper 145 and/or control a speed of the wiping action by the windshield wiper 145 by generating a wiper signal Wc to achieve the desired operation. The ECU 140 may be further configured to generate various signals that control other functions of the vehicle.

In various embodiments, the capacitive sensor 101 may operate in conjunction with a light sensor or be modified to function as a light sensor to improve the sensitivity of the capacitive sensor 101. For example, the capacitive sensor 101 may be used to detect weather conditions, such as snow and rain, before they touch the windshield and/or the capacitive sensor 101. In the present case, the capacitive sensor 101 may be formed using a transparent conductive material, such as indium tin oxide, polyethylene terephthalate (PET) film, a flexible printed circuit (FPC), and the like.

Referring to FIGS. 1A and 10-13, the sensing circuit 135 continuously monitors the capacitance of the capacitive sensor 101 and generates the logic signal according to the capacitance. The sensing circuit 135 may also continuously communicate with the ECU 140, so that when the sensing circuit 135 detects a change in capacitance, the ECU 140 may respond almost immediately. Accordingly, over a period of time, the sensing circuit 135 may generate a number of logic signals and transmit the logic signals to the ECU 140.

According to an exemplary operation, when a weather condition, such as rain, is present, the third electrode 115 connects the rain to the ground potential resulting in a decrease in capacitance and a corresponding increase in the digital value. If no rain is present, the capacitance of the sensing capacitor 101 and corresponding digital value remain substantially constant (e.g., as illustrated in FIG. 10).

Figure 13:
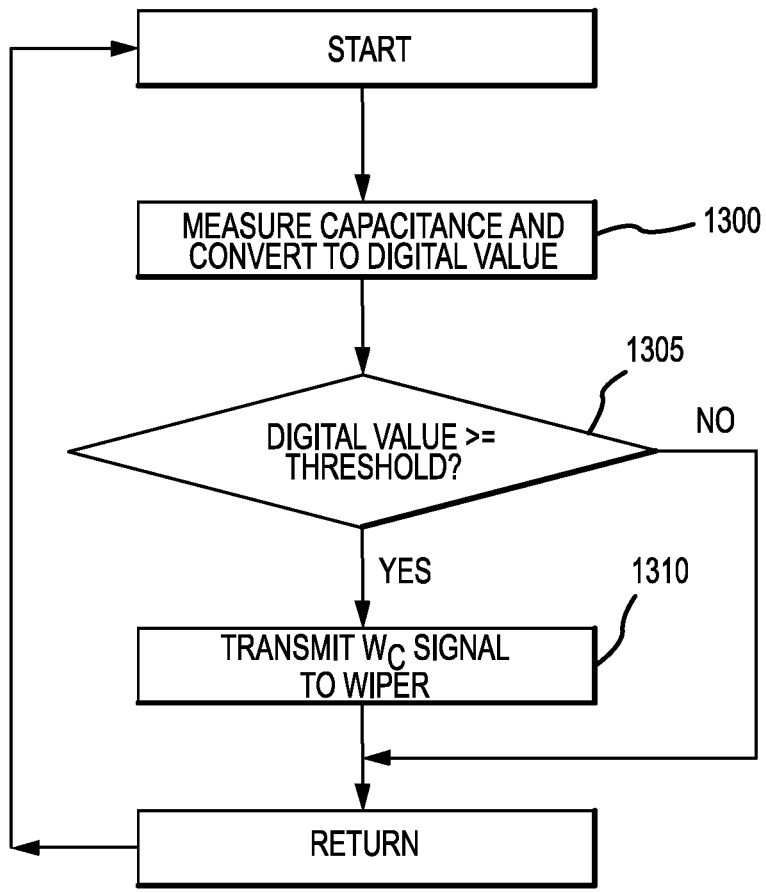
FIG. 13 is a flowchart for operating the system of FIG. 1 in accordance with the present technology.

In an exemplary operation, and referring to FIG. 13, the sensing circuit 135 may measure the capacitance of the sensing capacitor 101 and convert the capacitance into the digital value (1300) using the differential amplifier 165 and the ADC 180. The logic circuit 185 may then compare the digital value to the predetermined threshold $TH_R$ (1305). If the digital value is greater than or equal to the predetermined threshold $TH_R$, the logic circuit 185 communicates this condition to the ECU 140 and then the ECU 140 may transmit the wiper signal Wc to operate and/or control the windshield wiper 145 (1310). If the digital value is less than the predetermined threshold $TH_R$, the logic circuit 185 communicates this condition to the ECU 140 and the wiper signal Wc is not sent to the windshield wiper 145. The sensing circuit 135 may continuously monitor the capacitance of the capacitive sensor 101 and report the digital value to the logic circuit 185.

During a raining condition, and at the time the ECU 140 deploys the wiper signal Wc, the windshield wiper 145 removes the rain resulting in a decrease in the digital value. As rain continues to collect again, the digital value begins to increase until the digital value reaches the predetermined threshold $TH_R$ again. A heavy rain condition (e.g. as illustrated in FIG. 12) will trigger the wiper signal Wc with a greater frequency than a light rain condition (e.g., as illustrated in FIG. 11). Accordingly, the speed and/or frequency of the wiping action are directly related to the amount of rain.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An embedded capacitive sensor, comprising:
    a laminated glass structure comprising:
        a first glass layer comprising a first surface and a second surface;
        a second glass layer in parallel with the first glass layer, comprising a third surface and a fourth surface; and
        an interlayer interposed between the second surface of the first glass layer and the fourth surface of the second glass layer; and
    a capacitive sensor disposed within the interlayer and comprising:
        a first electrode; and
        a second electrode adjacent to the first electrode, wherein the first and second electrodes form a capacitance; and
    a companion sensor positioned on the third surface of the second glass layer and aligned with the capacitive sensor, wherein the companion sensor is electrically coupled to the capacitive sensor.

2. The embedded capacitive sensor according to claim 1, wherein the first electrode is disposed on the second surface and the second electrode is disposed on the fourth surface.

3. The embedded capacitive sensor according to claim 1, wherein the first electrode is disposed on the fourth surface and the second electrode is disposed on the second surface.

4. The embedded capacitive sensor according to claim 1, wherein the first and second electrodes are disposed on the second surface.

5. The embedded capacitive sensor according to claim 1, wherein the first and second electrodes are disposed on the fourth surface.

6. The embedded capacitive sensor according to claim 1, wherein the first and second electrodes comprise a transparent material.

7. The embedded capacitive sensor according to claim 1, wherein the interlayer comprises an adhesive material to bond the first and second layers together.

8. The embedded capacitive sensor according to claim 1, wherein the first and second electrodes are further configured to detect light.

9. The embedded capacitive sensor according to claim 1, wherein the capacitive sensor further comprises:
    a first electrode pad connected to the first electrode via a first wire, wherein the first electrode pad is electrically connected to the companion sensor; and
    a second electrode pad connected to the second electrode via a second wire, wherein the second electrode pad is electrically connected to the companion sensor.

10. The embedded capacitive sensor according to claim 9, wherein the companion sensor comprises:
    a first companion electrode that has a same pattern as the first electrode pad; and
    a second companion electrode that has a same pattern has the second electrode.

11. A method for detecting rain with an embedded capacitive sensor, comprising:
    forming an embedded capacitive sensor, wherein the embedded capacitive sensor comprises:
        a laminated glass structure comprising:
            a first glass layer;
            a second glass layer in parallel with the first glass layer; and
            an interlayer interposed between the first glass layer and the second glass layer;
        a capacitive sensor disposed within the interlayer and comprising:
            a first electrode;
            a second electrode adjacent to the first electrode;
            wherein the first and second electrode form a sensing capacitor;
        a companion sensor positioned on the second glass layer, wherein the companion sensor has a same pattern as the capacitive sensor, and the companion sensor is electrically coupled to the capacitive sensor; and
    measuring a capacitance of the sensing capacitor; and
    determining a presence of rain according to the measured capacitance.

12. The method according to claim 11, wherein determining the presence of rain comprises:
    converting the capacitance to a digital value;
    comparing the digital value to a threshold value; and
    generating a logic signal according to the comparison.

13. The method according to claim 12, wherein:
    the logic signal is a first value if the digital value is less than the threshold value and indicates an absence of rain; and
    the logic signal is a second value if the digital value is greater than or equal to the threshold value and indicates the presence of rain.

14. A system, comprising:
    a windshield;
    a capacitive sensor embedded within the windshield and comprising:
        a first electrode; and
        a second electrode in communication with the first electrode;
        wherein the first and second electrode form a sensing capacitor;

a companion sensor positioned on an outer surface of the windshield, wherein the companion sensor is aligned with the capacitive sensor and electrically coupled to the capacitive sensor;

a sensing circuit connected to the capacitive sensor and configured to:

measure a capacitance of the sensing capacitor; and determine a presence of rain based on the measured capacitance; and a control circuit connected to the sensing circuit and configured to generate a wiper signal, wherein the wiper signal controls an operation of a wiper blade.

15. The system according to claim 14, wherein the windshield comprises:

a first glass layer comprising a first surface and a second surface;

a second glass layer in parallel with the first glass layer, and comprising a third surface and fourth surface; and an interlayer interposed between the first glass layer and the second glass layer and directly contacting the second surface and the fourth surface.

16. The system according to claim 15, wherein the first electrode is disposed on the second surface and the second electrode is disposed on the fourth surface.

17. The system according to claim 15, wherein the first electrode is disposed on the fourth surface and the second electrode is disposed on the second surface.

18. The system according to claim 15, wherein the first and second electrodes are disposed on the second surface.

19. The system according to claim 15, wherein the first and second electrodes are disposed on the fourth surface.

20. The system according to claim 14, wherein the first and second electrodes comprise a transparent material.

* * * * *